(12) United States Patent
Harper

(10) Patent No.: US 7,016,313 B1
(45) Date of Patent: Mar. 21, 2006

(54) METHODS AND APPARATUS FOR GENERATING NETWORK TOPOLOGY INFORMATION

(75) Inventor: John Harper, London (GB)

(73) Assignee: Cisco Technology, Inc., San Jose, CA (US)

( * ) Notice: Subject to any disclaimer, the term of this patent is extended or adjusted under 35 U.S.C. 154(b) by 1102 days.

(21) Appl. No.: 09/896,416

(22) Filed: Jun. 28, 2001

(51) Int. Cl.
  *H04J 1/16* (2006.01)
(52) U.S. Cl. .................. 370/254; 370/389; 709/242
(58) Field of Classification Search ............... 370/401, 370/400, 395.53, 396, 392, 252, 254, 389; 714/4; 709/238–244
  See application file for complete search history.

(56) References Cited

U.S. PATENT DOCUMENTS 5,251,205 A * 10/1993 Callon et al. ............... 370/392
5,825,772 A * 10/1998 Dobbins et al. ............ 370/396

OTHER PUBLICATIONS

R. Callon, "Use of OSI IS-IS for Routing in TCP/IP and Dual Environments" RFC 1195, Dec. 1990, 64 pages.
J. Moy, "OSPF Version 2", RFC 2328, Apr. 1998, 155 pages.
Andrew S. Tanenbaum, "Third Edition Computer Networks", 1996, pp. 345-370.

* cited by examiner

*Primary Examiner*—John Pezzlo
(74) *Attorney, Agent, or Firm*—Beyer Weaver & Thomas LLP.

(57) ABSTRACT

According to a specific embodiment of the present invention, methods and apparatus are disclosed for generating network topology information. A first link state packet associated with a first node is identified. A second link state packet associated with a second node is identified. Network topology information associated with the first node is generated using information from the first link state packet. Verification of two-way connectivity between the first node and the second node is deferred until analysis of the second link state packet is initiated for generating network topology information associated with the second node.

56 Claims, 10 Drawing Sheets

Figure 2

| Node 101 Routing Table | | |
|---|---|---|
| Node | Next Hop | Link |
| Node 103 | Node 103 | Link 102 |
| Node 105 | Node 109 | Link 112 |
| Node 107 | Node 109 | Link 112 |
| Node 109 | Node 109 | Link 112 |
| Node 111 | Node 109 | Link 112 |

| | | | |
|---|---|---|---|
| PATH | Parent | | |
| | Node | | |
| | Metric | | |
| TENT | Parent | 101 | 101 |
| | Node | 103 | 109 |
| | Metric | 5 | 4 |

402 (PATH row), 404 (TENT row)

403

| | | | | |
|---|---|---|---|---|
| PATH | Parent | 101 | | |
| | Node | 109 | | |
| | Metric | 4 | | |
| TENT | Parent | 101 | 109 | 109 |
| | Node | 103 | 111 | 105 |
| | Metric | 5 | 6 | 7 |

405

| | | | | |
|---|---|---|---|---|
| PATH | Parent | 101 | 101 | |
| | Node | 109 | 103 | |
| | Metric | 4 | 5 | |
| TENT | Parent | 109 | 109 | |
| | Node | 111 | 105 | |
| | Metric | 6 | 7 | |

407

| | | | | |
|---|---|---|---|---|
| PATH | Parent | 101 | 101 | 109 |
| | Node | 109 | 103 | 111 |
| | Metric | 4 | 5 | 6 |
| TENT | Parent | 109 | 111 | |
| | Node | 105 | 107 | |
| | Metric | 7 | 9 | |

409

| | | | | | |
|---|---|---|---|---|---|
| PATH | Parent | 101 | 101 | 109 | 109 |
| | Node | 109 | 103 | 111 | 105 |
| | Metric | 4 | 5 | 6 | 7 |
| TENT | Parent | 111 | | | |
| | Node | 107 | | | |
| | Metric | 9 | | | |

411

| | | | | | | |
|---|---|---|---|---|---|---|
| PATH | Parent | 101 | 101 | 109 | 109 | 111 |
| | Node | 109 | 103 | 111 | 105 | 107 |
| | Metric | 4 | 5 | 6 | 7 | 9 |
| TENT | Parent | | | | | |
| | Node | | | | | |
| | Metric | | | | | |

| | | | | | | | |
|---|---|---|---|---|---|---|---|
| PATH | Verified? | | | | | | |
| | Parent | | | | | | |
| | Node | | | | | | |
| | Metric | | | | | | |
| TENT | Parent | 101 | 101 | | | | |
| | Node | 103 | 109 | | | | |
| | Metric | 5 | 4 | | | | |

503

| | | | | | | | |
|---|---|---|---|---|---|---|---|
| PATH | Verified? | No | | | | | |
| | Parent | 101 | | | | | |
| | Node | 109 | | | | | |
| | Metric | 4 | | | | | |
| TENT | Parent | 101 | 109 | 109 | | | |
| | Node | 103 | 111 | 105 | | | |
| | Metric | 5 | 6 | 7 | | | |

505

| | | | | | | | |
|---|---|---|---|---|---|---|---|
| PATH | Verified? | Yes | No | | | | |
| | Parent | 101 | 101 | | | | |
| | Node | 109 | 103 | | | | |
| | Metric | 4 | 5 | | | | |
| TENT | Parent | 109 | 109 | | | | |
| | Node | 111 | 105 | | | | |
| | Metric | 6 | 7 | | | | |

507

| | | | | | | | |
|---|---|---|---|---|---|---|---|
| PATH | Verified? | Yes | Yes | No | | | |
| | Parent | 101 | 101 | 109 | | | |
| | Node | 109 | 103 | 111 | | | |
| | Metric | 4 | 5 | 6 | | | |
| TENT | Parent | 109 | 111 | | | | |
| | Node | 105 | 107 | | | | |
| | Metric | 7 | 9 | | | | |

509

| | | | | | | | |
|---|---|---|---|---|---|---|---|
| PATH | Verified? | Yes | Yes | Yes | No | | |
| | Parent | 101 | 101 | 109 | 109 | | |
| | Node | 109 | 103 | 111 | 105 | | |
| | Metric | 4 | 5 | 6 | 7 | | |
| TENT | Parent | 111 | | | | | |
| | Node | 107 | | | | | |
| | Metric | 9 | | | | | |

511

| | | | | | | | |
|---|---|---|---|---|---|---|---|
| PATH | Verified? | Yes | Yes | Yes | Yes | No | |
| | Parent | 101 | 101 | 109 | 109 | 111 | |
| | Node | 109 | 103 | 111 | 105 | 107 | |
| | Metric | 4 | 5 | 6 | 7 | 9 | |
| TENT | Parent | | | | | | |
| | Node | | | | | | |
| | Metric | | | | | | |

| PATH | Verified? | Yes | Yes | No | | |
|---|---|---|---|---|---|---|
| | Parent | 101 | 101 | 109 | | |
| | Node | 109 | 103 | 111 | | |
| | Metric | 4 | 5 | 6 | | |
| TENT | Parent | 109 | 111 | | | |
| | Node | 105 | 107 | | | |
| | Metric | 7 | 9 | | | |

603

| PATH | Verified? | Yes | Yes | Yes | No | |
|---|---|---|---|---|---|---|
| | Parent | 101 | 101 | 109 | 109 | |
| | Node | 109 | 103 | 111 | 105 | |
| | Metric | 4 | 5 | 6 | 7 | |
| TENT | Parent | 111 | | | | |
| | Node | 107 | | | | |
| | Metric | 9 | | | | |

605

| PATH | Verified? | Yes | Yes | Yes | Yes | No |
|---|---|---|---|---|---|---|
| | Parent | 101 | 101 | 109 | 109 | 111 |
| | Node | 109 | 103 | 111 | 105 | 107 |
| | Metric | 4 | 5 | 6 | 7 | 9 |
| TENT | Parent | | | | | |
| | Node | | | | | |
| | Metric | | | | | |

607

| PATH | Verified? | Yes | Yes | No | | |
|---|---|---|---|---|---|---|
| | Parent | 101 | 101 | 109 | | |
| | Node | 109 | 103 | 111 | | |
| | Metric | 4 | 5 | 6 | | |
| TENT | Parent | 109 | | | | |
| | Node | 105 | | | | |
| | Metric | 7 | | | | |

609

| PATH | Verified? | Yes | Yes | Yes | No | |
|---|---|---|---|---|---|---|
| | Parent | 101 | 101 | 109 | 109 | |
| | Node | 109 | 103 | 111 | 105 | |
| | Metric | 4 | 5 | 6 | 7 | |
| TENT | Parent | 105 | | | | |
| | Node | 107 | | | | |
| | Metric | 14 | | | | |

611

| PATH | Verified? | Yes | Yes | Yes | Yes | No |
|---|---|---|---|---|---|---|
| | Parent | 101 | 101 | 109 | 109 | 105 |
| | Node | 109 | 103 | 111 | 105 | 107 |
| | Metric | 4 | 5 | 6 | 7 | 14 |
| TENT | Parent | | | | | |
| | Node | | | | | |
| | Metric | | | | | |

USOO7016313B1

US 7,016,313 B1

METHODS AND APPARATUS FOR GENERATING NETWORK TOPOLOGY INFORMATION

BACKGROUND OF THE INVENTION

The present invention relates to link state routing. More specifically, the present invention relates to generating network topology mapping with two-way connectivity checking.

Generally, a network topology map is used to generate routing tables at specific network nodes. The routing tables allow the network nodes to determine the appropriate "next hop" of a packet. In order to generate a network topology map at a specific node, various network topology information can be transmitted from other network nodes. Each network node can create a link state packet containing information about the distance, delay, or cost to each of its neighbors. Distance, delay, or cost all refer to some metric associated with the link between nodes. The packet is then transmitted to all of the network nodes in the network. As one of skill in the art would appreciate, a network node receiving link state packets from the other nodes in a network can apply Dijkstra's algorithm to generate a network topology map for building a routing table.

The network node receiving link state packets from the other nodes is termed the root node. Each link state packet is processed based on distance from the root node. As the link state packet of a current node is processed, the links between the current node and each of the current node's neighbors is checked for two-way connectivity. The two-way connectivity check allows the verification of a particular link. More specifically, the two-way connectivity check allows a router to ensure that two nodes both indicate they have a link to each other.

As one of skill in the art would appreciate, typical two-way connectivity checking requires more than one traversal of link state packets. Because of the volume of nodes in a network, the additional traversal of a link state packet consumes valuable time and resources.

Currently available techniques for generating a network topology map with two-way connectivity checking for building a routing table in a network node connected to a network have significant disadvantages with regard to time and processing resources. It is therefore desirable to provide a system for generating a network topology map with two-way connectivity checking that exhibits improved characteristics as compared to conventional techniques.

SUMMARY OF THE INVENTION

According to a specific embodiment of the present invention, methods, computer program products, and apparatus are disclosed for generating network topology information. A first link state packet associated with a first node is identified. A second link state packet associated with a second node is identified. Network topology information associated with the first node is generated using information from the first link state packet. Verification of two-way connectivity between the first node and the second node is deferred until analysis of the second link state packet is initiated for generating network topology information associated with the second node.

Other embodiments of the invention are directed to a method and computer program product for generating network topology information. Link state packets are received from a plurality of network nodes. A single scan of the link state packets from the plurality of network nodes is performed to generate network topology information associated with the plurality of network nodes. The single scan performs two-way connectivity checking between two or more network nodes.

Other embodiments of the invention are directed to a method and computer program product for generating network topology information. First network topology information is generated using a first link state packet from a first node. Second network topology information is generated using a second link state packet from a second node. The second network topology information comprises performing two-way connectivity verification between the first node and the second node.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 2 is a diagram depicting one possible representation of a routing table, according to specific embodiments.

FIGS. 4–6 show specific examples of data structures used for generating routing table info using the link state packet information of FIGS. 3A and 3B, in accordance with specific embodiments of the present invention.

DETAILED DESCRIPTION OF SPECIFIC EMBODIMENTS

Figure 1:
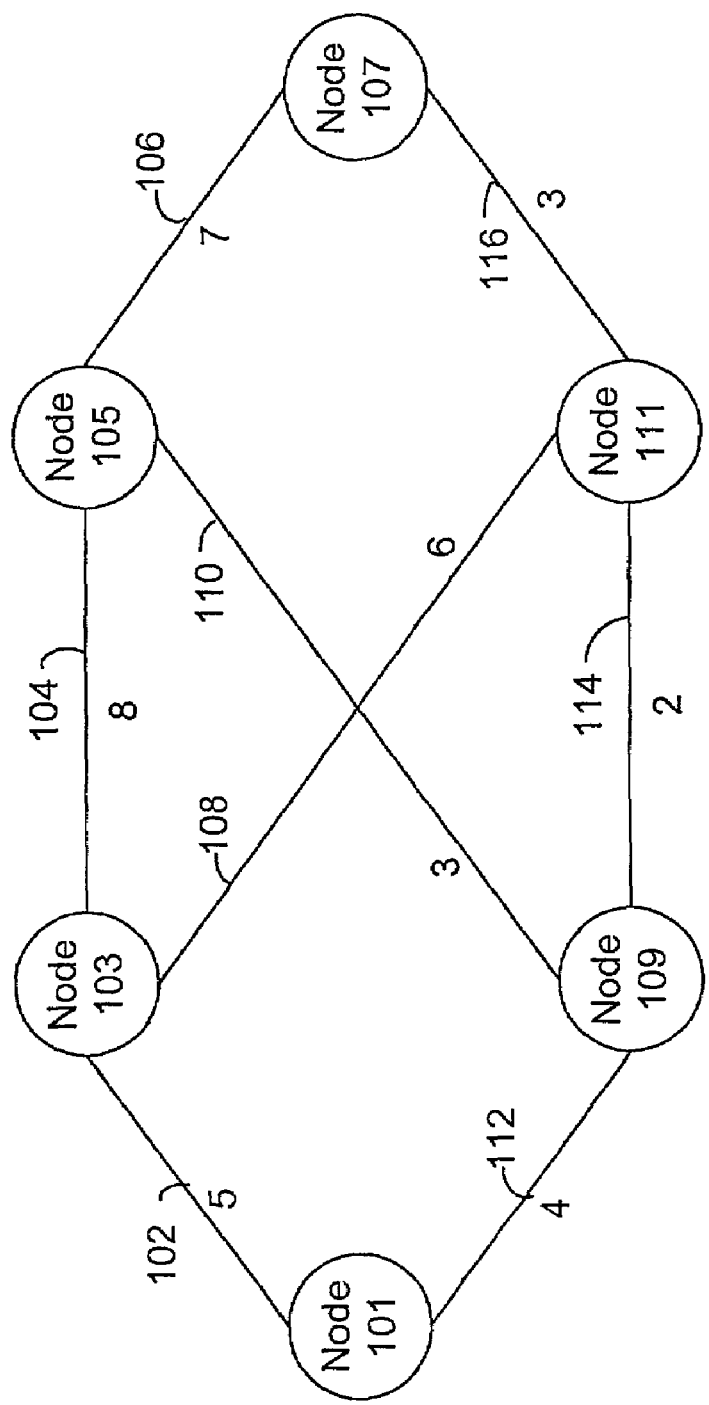
FIG. 1 shows an example of a portion of a network topology which may be used for describing the technique of the present invention.

This invention pertains to methods and systems for generating network topology information which includes two-way connectivity checking. FIG. 1 is an example of a topology map that can be used for illustrating the technique of the present invention. Each network node 101, 103, 105, 107, 109, and 111 represents a network device such as a router or a switch. Nodes are connected to other nodes through communication lines or links 102, 104, 106, 108, 110, 112, 114, and 116. For example, network node 101 is connected to node 103 through link 102. Each link is assigned a metric value. The metric value can be a geographic distance, or some function of distance, bandwidth, average traffic, communication cost, delay, or other type of cost. In FIG. 1, link 102 between nodes 101 and 103 is assigned a metric value of 5. Link 112 between nodes 109 and 101 is assigned a metric of 4. In the present example, a lower assigned metric value would indicate a preferred link. Metric values are added to determine total costs for a particular path. To access node 105 from node 101, a packet can travel though links 102 and 104 with metric values of 5 and 8 totaling 13 or it can travel through links 112 and 110 with metric values of 4 and 3 totaling 7. The preferred path between node 101 and 105 would comprise links 112 and 110.

In order for network node 101 to determine the preferred "next hop" in routing a packet to its destination, network node 101 uses a routing table.

FIG. 2 depicts one possible representation of a routing table for node 101, according to one embodiment. Column 201 shows the destination nodes accessible in the network. Each destination node corresponds with a link in column 203 and a next hop in column 213. It should be noted that routing tables may contain a node in column 201 with a next hop 213 without storing a link 203. A variety of implementations are available. A packet with a destination node 103 in table entry 205 would be transmitted on link 102 based on table entry 207 to next hop 103 shown in table entry 215. A packet with a destination node 209 would be transmitted on link 112 based on table entry 211 to next hop 109 based on table entry 217. The routing table allows node 101 to route the packet along the link included in the preferred path. Although the routing table is configured with specific links, routing tables can use other types of information. For example, the routing table can include the "next hop" instead of a specific link, or it can include a specific interface. The routing table can also include optional information such as metrics.

Several algorithms are used to find the preferred path between two nodes in a topology map. Dijkstra's algorithm (1959) can be run to compute the preferred path to all possible destinations. Dijkstra's algorithm and link state routing methodology generally is described in *Computer Networks*, Andrew Tanenbaum, Prentice Hall, New Jersey (1996, 3$^{rd}$ Edition), the entirety of which is hereby incorporated by reference for all purposes. Dijkstra's algorithm can be used in conjunction with link state routing protocols to build routing tables for a particular network node. Routing protocols include OSPF (Open Shortest Path First) and IS—IS (Intermediate System-Intermediate System). IS—IS is described in ISO/IEC 10589 and RFC 1195, the entirety of which are hereby incorporated by reference for all purposes.

In order to determine network topology to build a routing table, information from each node in the network is used. The link state routing algorithm can request that each router to provide a metrics associated with each link connecting it to its neighbors.

Figure 3A:
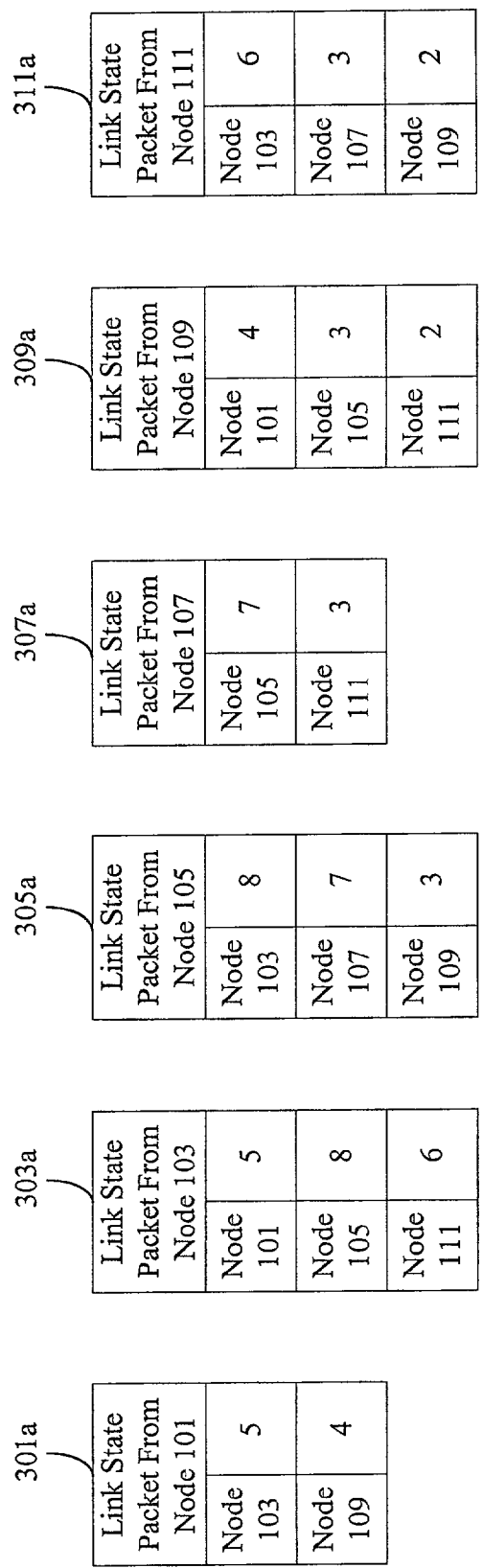
FIGS. 3A and 3B are diagrams showing possible representations of link state packets which may be generated from the topology of FIG. 1, according to specific embodiments.

As soon as a router determines a metric value for each of its links, it builds link state packets containing information about metric values associated with its links. FIG. 3A shows the link state packets that the network nodes in FIG. 1 would build. A link state packet 301 generated at node 101 includes a metric value of 5 corresponding to the link to node 103, and a metric value of 4 corresponding to the link to node 109. A link state packet 309 generated at node 109 includes the metric value of 4 corresponding to the link to node 101, the metric value of 3 for the link to node 105, and a metric value of 2 for the link to node 111. According to a specific embodiment, the link state packets are distributed from each network node to all other nodes in the network. Methods for distributing link state information are described in OSPF Version 2 (RFC 2328) and in IS—IS (ISO/IEC 10589-RFC 1195), the entirety of which are hereby incorporated by reference for all purposes. Thus, for example, a link state packet 311 from node 111 may be distributed to nodes 101, 103, 105, 107, and 109.

A network node generating a network topology map using the link state packets in FIG. 3A can verify two-way connectivity. Each link in FIG. 3A is represented twice or in two directions. For example, link state packet 311a from node 111 indicates that node 111 has a link to node 107. Similarly, the link state packet 307a from node 107 indicates that node 107 has a link to node 111. Two-way connectivity checking is satisfied since both link state packets indicate that the nodes have links to each other.

Figure 3B:
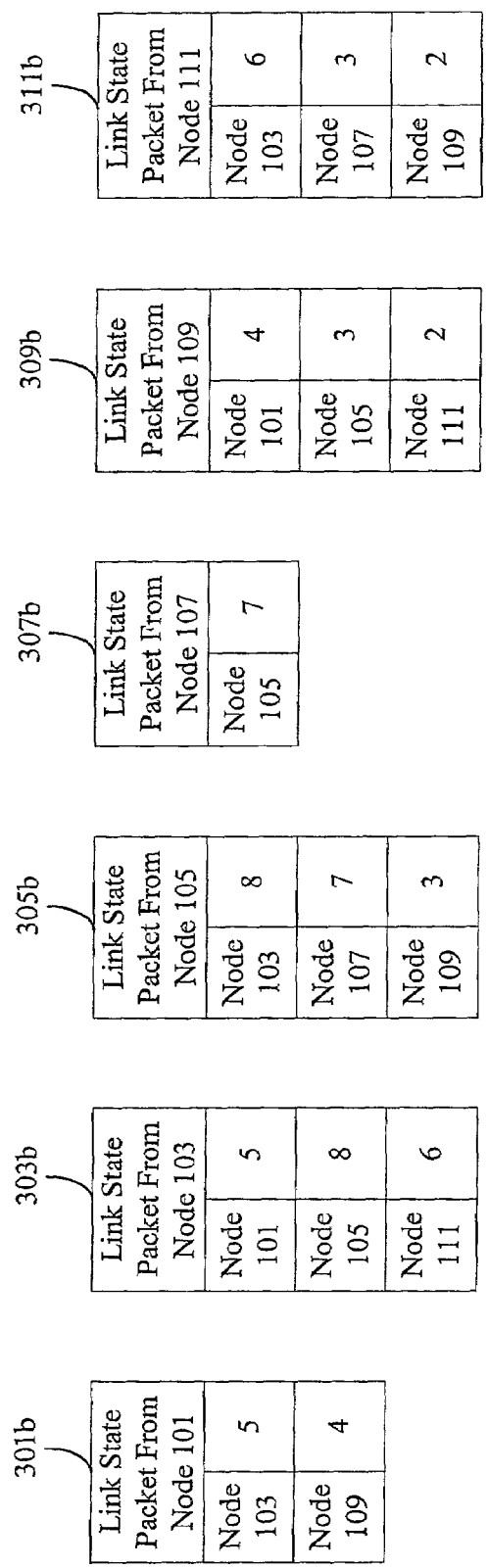

On the other hand, FIG. 3B shows link state packets that would not meet the two-way connectivity check. The link state packet 307b from node 107 indicates that node 107 does not have a link to node 111. However, the link state packet 311b from node 111 indicates node 111 does have a link to node 107. Two-way connectivity checking is not satisfied because only node 107 indicates that it has a link to node 111.

According to a specific embodiment, after a specific router has received link state packets from all or a selected portion of the network nodes, the specific router may then determine network topology info and generate a network routing table.

FIG. 4 shows a diagram depicting data structures at various processes during the determination of a network topology map using Dijkstra's algorithm. As one with skill in the art would appreciate, each PATH (permanent) 402 and TENT (tentative) 404 data structure contains a parent field, a node field, and a metric field indicating the value of the metric associated with the link between the parent and the node. Although PATH 402 and TENT 404 data structures can be used, a variety of other data structures and techniques well known to those of skill in the art can be used to determine network topology. A node 101 constructing a network topology map will initially contain an empty PATH data structure. The neighbors of node 101 are placed in the TENT data structure at 401. As one of skill in the art would appreciate, the node connected to node 101 with the smallest link metric is moved into the PATH data structure. Node 109 is moved into the PATH data structure because its link metric of 4 is less than the link metric of 5 associated with the link between node 103 and 101.

Before node 109 is moved into the PATH data structure, however, link state routing algorithms may require application two-way connectivity checking. Two-way connectivity checking ensures that the link state packets from node 101 and node 109 both indicate that the two nodes have link to each other. As one skilled in the art would appreciate, two-way connectivity checking provides a mechanism to avoid errors in link failure situations and generally improves reliability of the network topology information generated at each node.

Conventionally, however, two-way connectivity checking requires that the link state packet of node 109 be traversed at this time in order to determine whether the link state packet of node 109 contains a link to node 101. The link state packet of node 109 is typically traversed at this time only to check for two-way connectivity. The traversal requires valuable processor resources and time, particularly since link state packets may contain information about many nodes and two-way connectivity checking is performed on every link in the network. The present invention does not require that a second link state packet be traversed at this time for the purpose of verifying two-way connectivity. According to specific embodiments of the present invention, two-way connectivity checking can be performed by traversing each link state packet once.

After two-way connectivity checking is performed for the link between node 101 and node 109, node 109 is placed into the PATH data structure with a metric value of 4 and a parent node 101. The link state packet of node 109 is then examined to find neighbors of node 109. Node 105 with as metric of 7 through node 109 is not in PATH or TENT data structures and is added to the TENT data structure. Node 11 with a metric of 6 from node 101 is also added to the TENT data structure at 403. Node 101 is already in the PATH table and is therefore ignored.

The link state packet of node 103 is checked for two-way connectivity to ensure that node 101 is a neighbor at 405. Node 103 is determined to have the shortest metric to node 101 and is placed in the PATH data structure at 405. The neighbors of node 103 are examined. Nodes 105 and 111 each have metrics from 101 through node 103 that are greater than the metrics through node 109 already placed in the TENT data structure. Nothing is added to the TENT data structure at 405.

Node 111 with a length of 6 is added to the PATH data structure after two-way connectivity checking at 407. The link state packet of node 111 is examined to find neighbors of 111 that may be added to the TENT data structure. Node 107 has a metric from node 101 through parent node 111 of 9 and is added to the TENT data structure. Node 103 and node 109 are already in the PATH data structure and are not added to the TENT data structure.

Node 105 is added to the PATH data structure at 409 after two-way connectivity checking. The neighbors of node 105 are examined in the link state packet from 105 to determine with 105 has a better path to one of its neighboring nodes 107, 103, or 109. Nodes 103 and 109 are already in the PATH data structure and are not added to the TENT data structure. Node 107 has a metric of 14 through node 105 from node 101. The metric of 14 is greater than the metric already contained in the TENT data structure for node 107, so the TENT data structure is not modified. Node 107 is then added to the PATH data structure after two-way connectivity checking.

Node 101 has a complete PATH data structure at 411 and can now construct a routing table. A packet destined for node 109 is sent along the link connecting 101 and 109. A packet destined for node 103 is sent a long the link connectivity 101 and 103. A packet destined for node 111 has an optimal path through parent node 109, so the packet is sent along the link connecting 101 and 109. The same holds true for node 105. Node 107 has a preferred path through node 111 that has a preferred path through 109, so the packet is sent along the link connecting 101 and 109. A routing table is constructed with the derived link data so that a router can determine on what link a packet should be sent.

Figure 7A:
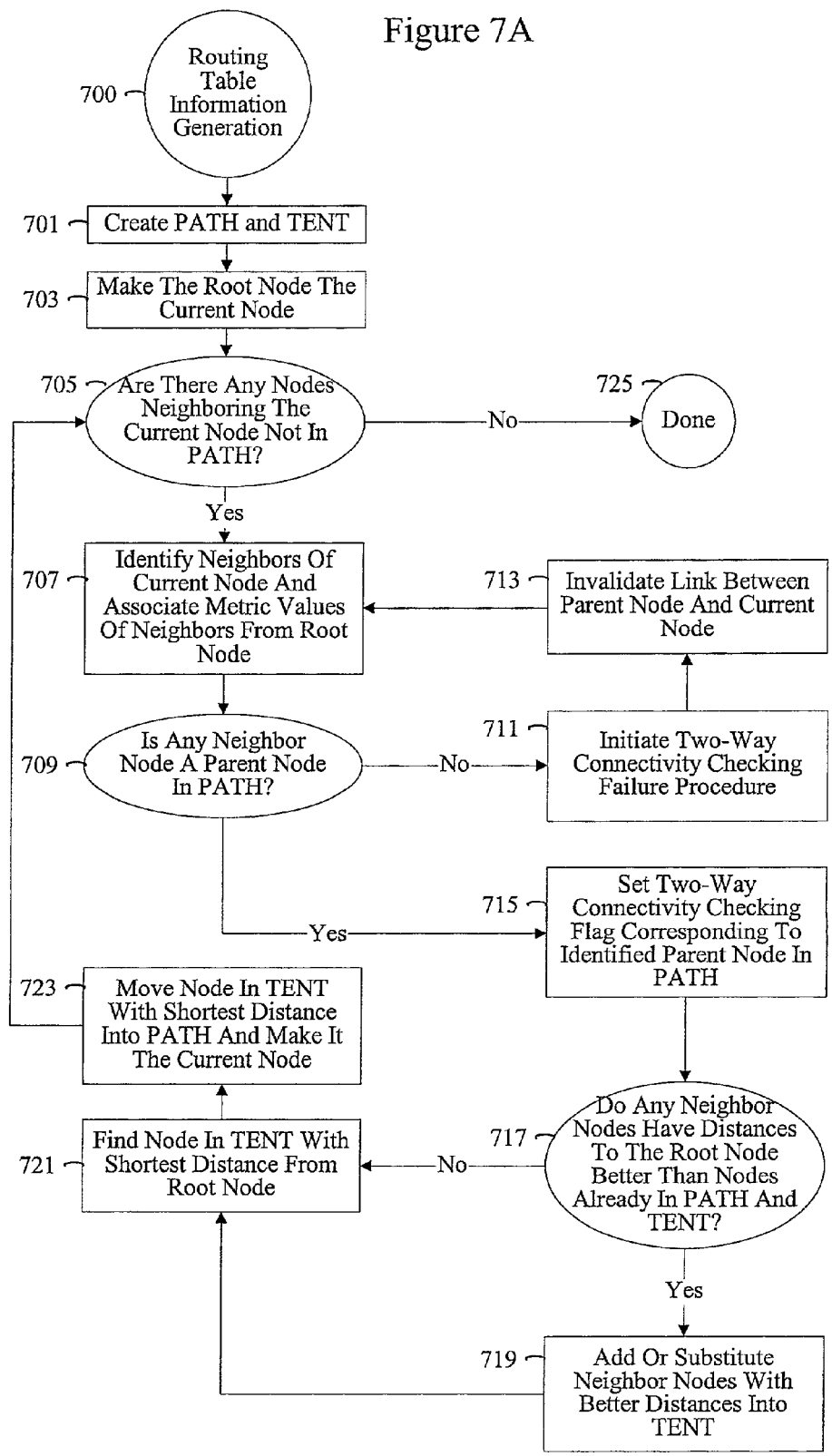
FIGS. 7A–C show flow diagrams of a routing table information generation procedure, according to specific embodiments.

The technique of the present invention will now be described with reference to FIG. 1, FIG. 5 and FIG. 7A. FIG. 5 is a diagram of tentative and permanent path data structures depicted at various stages of generating a network topology map using the network topology of FIG. 1. It is assumed for purposes of this example that the nodes have link state packets as described in FIGS. 3A and 3B. FIG. 7A diagrams the methodology for arriving at the various TENT and PATH data structures depicted in FIG. 5. The data structures can be used to generate a network topology map with two-way connectivity checking between parent and child nodes. Typically, the link state packets of child nodes are traversed once to ensure that they have a connection to the parent and simultaneously to determine the metric of neighboring nodes. FIG. 5 shows generation of a network topology map with two-way connectivity checking between parent and child nodes while traversing the link state packet of the child node once. The link state packet of a parent node is analyzed to find an appropriate child node. Link state connectivity checking between the parent node and the child node is deferred until the link state packet of the child node is analyzed. Each link state packet can be traversed a single time to generate a network topology map with two-way connectivity checking performed.

According to specific embodiments, PATH and TENT data structures containing a parent field, a node field, and a metric field indicating the value of the metric associated with the link between the parent and the node are created (701, FIG. 7A). The PATH data structure also contains a verification flag to indicate whether two-way connectivity checking has been performed. According to various embodiments, only one verification flag is needed for the entire PATH data structure. The flag can be reused for each node. Using one flag allows optimization without additional variable storage.

According to other embodiments, the number of flags can be limited by the number of parent nodes tracked. Instead of a single flag, an array of flags can be used to track multiple parents. In one example, the size of the array is equal to the maximum number of parents that will be accepted for equal-cost path splitting in the basic Dijkstra algorithm. Each flag can be set to false initially, and later set to true when reverse connectivity for the corresponding parent is found. At the end of the link state packet scan, if any flag is still false, the corresponding parent is removed. According to various embodiments, if there are no remaining parents, then it may be determined that there is no two-way connectivity for the parent.

In an example using a single flag, a root node is then set (703) as the current node. In FIG. 5, the root node is node 101. At 501, the root node 101 is the current node. A node 101 constructing a network topology map can initially contain an empty PATH data structure.

If it is determined (705) that there are any nodes neighboring the current node, the total metrics of the neighboring nodes from the root node are determined (707). Referring to FIG. 5 at 501, nodes 103 and 109 neighbor the current node 101. The total metrics of node 103 and 109 from the root node, which happens to be the current node 101, are 5 and 4 respectively. Thus, as shown at 501, the nodes 103 and 109 are placed into TENT along with the associated metric values.

If it is determined (709) that any neighboring node is a parent node in PATH, the two-way connectivity checking flag for the link between the neighboring node and the parent node or the neighboring node and the root node is set (715) to indicate that two-way connectivity has been verified. If PATH is empty, two-way connectivity checking is temporarily ignored as is the case at 501. If it is determined (717) that any neighboring nodes have metrics to the root node less than nodes already in PATH and TENT, the neighboring nodes are added or substituted (719) into the TENT data structure. Referring to 501, neighboring nodes 103 and 109 are added into the TENT data structure because the metrics of 5 and 4 associated with nodes 103 and 109 are less than the metrics of nodes already in PATH and TENT.

The node in TENT with the smallest metric or shortest distance from the root node is determined (721). In FIG. 5 at 501, node 109 has the smallest metric to root node 101. Node 109 is moved (723) to the PATH data structure and is set as the current node.

Node 109 is moved into the PATH data structure with parent 101 and a metric value of 4 without performing two-way connectivity checking. The two-way connectivity checking in fact will be deferred until the link state packet of node 109 is analyzed, as described in greater detail below.

According to specific embodiments, the link state packet (309a) of node 109 is then analyzed (705) in order to generate network topology information using information from the link state packet (309a). Node 101 is the root node and is already in the PATH table as a parent. Since node 109 indicates that it has a path to 101, the link between node 101 and 109 now has been verified for two-way connectivity. It should be noted two-way connectivity checking for the link between node 101 and node 109 did not require that the link state packet (309a) of node 109 be traversed at this time. Using conventional two-way connectivity checking, the link state packet (309a) would be traversed once to find the neighbors of node 109 and again when a link between a neighboring node and node 109 is checked for two-way connectivity.

The flag associated with node 109 and parent 101 in the PATH data structure can now be set (715) to indicate that two-way connectivity checking has been verified. Node 105 with a metric of 7 through node 109 is not in PATH or TENT data structures and is added (717) to the TENT data structure because neighboring node 105 has a metric to the root node better than any node already in PATH or TENT. Node 111 with a metric of 6 from node 101 is similarly added to the TENT data structure at 503.

Node 103 with the shortest distance from the root node 101 is found (721). Node 103 is set (723) as the current node placed into the PATH table at 503. Node 103 is set (723) as the current node and moved into the PATH table without checking for two-way connectivity. It should be noted that two-way connectivity checking is deferred until the link state packet (303a) from the child node is analyzed for generating network topology information. The link state packet (303a) of node 103 is examined to find neighbors of node 103. If it can be determined (717) that nodes 105 and 111 each have metrics from 101 through node 103 that are greater than the metrics through node 109 already placed in the TENT data structure. Node 101 is already in the PATH data structure as a parent of node 103. Two-way connectivity check between node 101 and node 103 has now been verified. Nothing is added to the TENT data structure at 505.

Node 111 with a length of 6 is added to the PATH data structure while deferring two-way connectivity checking at 507. The link state packet of node 111 is examined to find neighbors of node 111 that may be added to the TENT data structure. Node 107 has a metric from node 101 through parent node 111 of 9 and is added to the TENT data structure. Node 103 and node 109 are already in the PATH data structure and are not added to the TENT data structure. Since the link state packet of node 111 indicates that node 109 is a neighbor, the two-way connectivity check verification flag is set in the PATH data structure for node 111 with parent 109.

Node 105 is added to the PATH data structure at 509 while deferring two-way connectivity checking. The link state packet of node 105 then is examined to find the remaining node closest to node 101. Nodes 103 and 109 are already in the PATH data structure and are not added to the TENT data structure.

It should be noted that a child node can have multiple parents due to path splitting. Path splitting occurs when multiple paths have the same metric to a destination node. For example, a node A may have a metric of 5 to node D through node B and a metric of 5 to node D through node C. A network device may then send some traffic through node B and other traffic through node C.

The link between node C and D can be added to the PATH data structure without checking two-way connectivity. The second link between a node B and D can similarly be added. Both links can be verified for two-way connectivity when the link state packet of node D is traversed to find the neighbors of node D. When the link state packet of node D includes links to both B and C, the flag for the link between C and D and the flag for the link between B and D can be set to verified.

Referring to FIG. 7A and FIG. 5, the process of FIG. 7A continues until network node 101 has a complete PATH data structure at 511 that can be used to construct a routing table.

Figure 7B:
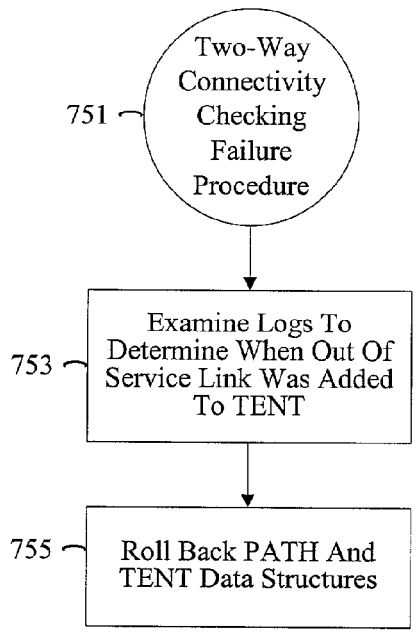

When two-way connectivity checking fails, several methods of recovery are possible. One recovery technique is reverse path insertion which will be described in detail below. A different technique expected to be used relatively infrequently is restarting network topology map generation in its entirety. The process can use explicit two-way connectivity checking as described in FIG. 4. The restart procedure can be used in systems where two-way connectivity checking rarely fails. An alternative procedure is shown in FIG. 6. FIG. 6 is a diagram of tentative and permanent path data structures depicted at various stages of network topology map generation when deferred two-way connectivity checking shows link failure, as shown, for example, in FIG. 3B of the drawings. FIG. 6 will be described with reference to FIG. 7B and FIG. 1. FIG. 7B describes techniques for recovery from two-way connectivity check failure.

Instead of replacing the contents of the PATH and TENT data structures as nodes are added and moved, the PATH and TENT data structures can be logged, or snapshots of PATH and TENT data structure states can be stored temporarily. However, logging may be both memory and CPU intensive. Logging or checkpointing may used in relatively few embodiments.

According to the process of FIG. 7A, network nodes are added to the PATH and TENT data structures at 601, 603, 605, 607, and 609. The process for adding information to the TENT and PATH data structures of FIG. 6 is similar to the process described previously with respect to FIG. 5 of the drawings. At 605, the link state packet of node 107 is examined to verify that it contains a route to node 111. The link state packet of node 107, as denoted in FIG. 3B, does not contain node 111. Node 107 may have determined that the link connecting node 111 to node 107 is down. Two-way connectivity checking would fail in this instance. Node 107 with parent 111 is added to the PATH data structure but two-way connectivity checking fails. According to various embodiments, the failure to verify two-way connectivity checking requires that the PATH and TENT data structures be rolled back.

FIG. 7B describes a two-way connectivity checking failure procedure where the PATH and TENT data structures are rolled back. Logs of the PATH and TENT data structures are maintained throughout the process of FIG. 7A and used in the process or FIG. 7B. The logs may comprise actual PATH and TENT data structures, or they may comprise the data held in the PATH and TENT data structures at any given time. The logs are examined (753) to determine when the out of service link was added into the TENT data structure. Upon examination of the data structure logs, it can be determined that node 107 with parent 111 was added into the TENT data structure at 607 according to FIG. 6. The PATH and TENT data structures are rolled back (755) to the state shown in data structures at 601. The rolled back state is represented in the PATH and TENT data structures at 607.

Figure 7C:
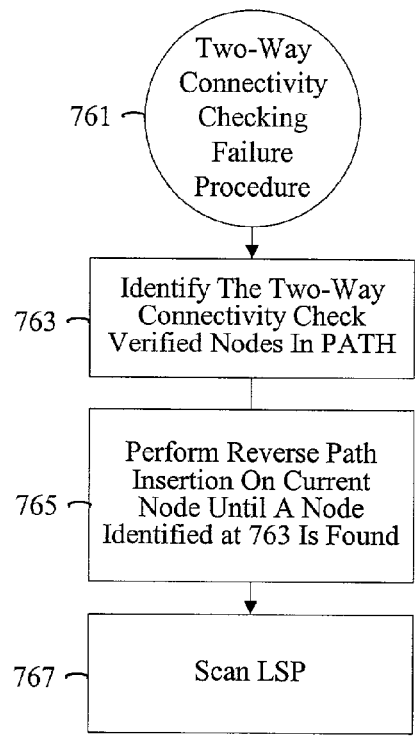

FIG. 7C describes another embodiment of a two-way connectivity checking failure procedure where PATH and TENT data structure logs are not used. At 605, a node 107 is determined not to have a link to node 111. The nodes in the PATH data structure are identified at 763. Reverse path insertion can be applied to node 107. Generally, reverse path insertion generally refers to the logic and methodology for finding a path from a destination node to the root node.

According to one embodiment, the process associated with FIG. 5 or FIG. 7C is used to perform reverse path insertion. The process associated with FIG. 5 or FIG. 7C is performed on a destination node find a path from the destination node to the root node. As noted in FIG. 5, the link state packet of node 107 is scanned to find out which link gives it the shortest metric to the root. According to various embodiments, the shortest metric from the destination node to the root through a parent node can be determined by finding the metric of the parent node added to the cost of the link between the parent and destination node reported by the parent node's link state packet. Two-way connectivity checking can be explicitly performed as the link state packet of the parent is scanned to find the metric from the root. Consequently, instead of performing the process described in FIG. 5 from the root node to node 107, the process described in FIG. 5 is performed from node 107 to the root node.

The process described in FIG. 5 can be performed on node 107 until a node already in the PATH data structure is found (765) in a pathway between node 107 and the root node. In other words, the process of FIG. 5 can be performed on node 107 until a node identified (763) is found.

According to various embodiments an LSP scan is conducted (767). Each neighbor of a subject node 107 is examined to determine if it already has two-way connectivity to the selected node. At the end of the LSP scan, the optimal metric is determined. The subject node (107) is then placed in TENT with the optimal metric with the optimal neighbor as its parent. If no such parent is found, then the node is left as unreachable. It should be noted, however, that the node may well be found again later from another parent (not yet in PATHS) when that node is processed.

The identified node is moved (767) from the PATH data structure to the TENT data structure. According to one embodiment, node 107 has a link to neighbor 105, and neighbor 105 is already in the original PATH data structure at 609. Node 105 in the PATH data structure is removed and placed into the TENT data structure at 607. It should be appreciated by one of skill in the art that if node 105 is not in the PATH data structure, the node can be left as unreachable.

After either one of the two-way connectivity failure process described in FIG. 7B or FIG. 7C has completed, the link between parent node 111 and current node 107 is invalidated at 713.

It should be noted that the present invention does not require that the processes of this procedure be performed in any specified sequence. For example, in one embodiment of the invention, the link between parent node 111 and current node 107 can be invalidated before the PATH and TENT data structures are modified or rolled back to the state shown at 607.

Continuing with FIG. 6, node 105 with parent 109 is added to the PATH data structure at 609 while deferring two-way connectivity checking. The link state packet of node 107 is examined to determine what entities neighbor node 107. Upon finding that node 105 neighbors node 107, the two-way connectivity check flag for node 105 is set to verified. The link state packet of node 105 indicates that it has a link to node 107 with a metric of 14. The link is added into the TENT data structure at 609.

At 611, node 107 with parent 105 is added into the PATH data structure at 611 while deferring two-way connectivity checking. The link state packet of node 107 is examined to determine that node 105 neighbors node 107. The link between node 107 and node 105 has passed the test for two-way connectivity.

Node 101 now has a complete PATH data structure and can now construct a routing table. A packet destined for node 109 is sent along the link connecting 101 and 109. A packet destined for node 103 is sent along the link connecting 101 and 103. A packet destined for node 111 has an optimal path through parent node 109, so the packet is sent along the link connecting 101 and 109. The same holds true for node 105. Node 107 has a preferred path through node 105 that has a preferred path through 109, so the packet is sent along the link connecting 101 and 109. A routing table is constructed with the data so that a router can determine on what link a packet should be sent.

Generally, the optimized two-way connectivity check techniques of the present invention may be implemented on software, firmware, and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the optimized two-way connectivity check technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the traffic handling devices of this invention may be specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the optimized two-way connectivity check technique of this invention may be implemented on a general-purpose network host machine such as a personal computer or workstation. Further, the invention may be at least partially implemented on a card (e.g., an interface card) for a network device or a general-purpose computing device.

Figure 8:
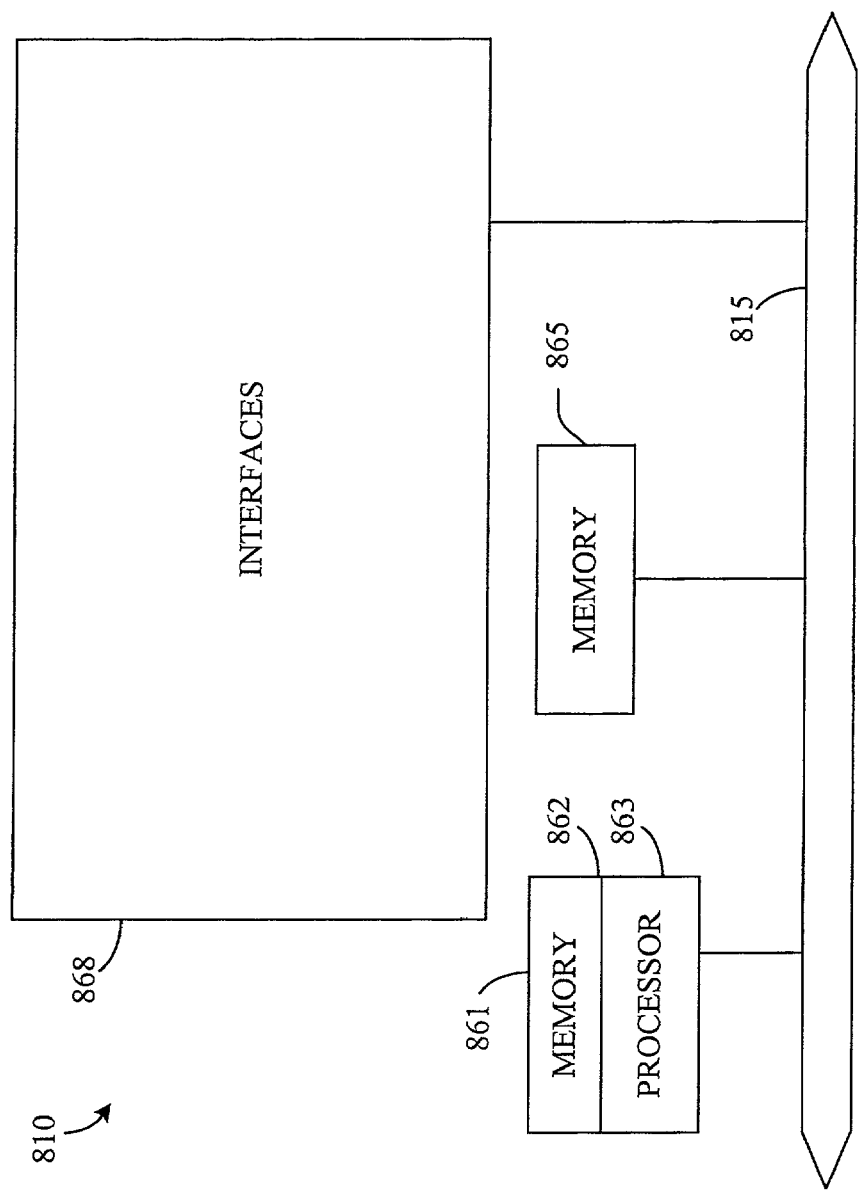
FIG. 8 is a block diagram showing the components of a network device which may be used for implementing the technique of the present invention, according to specific embodiments.

Referring now to FIG. 8, a network device 860 suitable for implementing the optimized two-way connectivity check techniques of the present invention includes a master central processing unit (CPU) 862, interfaces 868, and a bus 815 (e.g., a PCI bus). When acting under the control of appropriate software or firmware, the CPU 862 may be responsible for implementing specific functions associated with the functions of a desired network device. For example, when configured as a traffic handling device, the CPU 862 may be responsible for analyzing packets, encapsulating packets, forwarding packets to appropriate network devices, generating and analyzing link-state packets, generating routing table information, etc. The CPU 862 preferably accomplishes all these functions under the control of software including an operating system (e.g. Windows NT), and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 865) configured to store data, program instructions for the general-purpose network operations and/or other information relating to the functionality of the optimized two-way connectivity check techniques described herein. The program instructions may control the operation of an operating system and/or one or more applications, for example. The memory or memories may also be configured to include data structures which store routing information, PATH and TENT data structures, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. Therefore, the scope of the invention should be determined with reference to the appended claims.

What is claimed is:

1. A method for generating network topology information, the method comprising:

identifying a first link state packet associated with a first node;

identifying a second link state packet associated with a second node;

generating network topology information associated with the first node using information from the first link state packet; and deferring verification of two-way connectivity checking between the first node and the second node until analysis of second link state packet is initiated for generating network topology information associated with the second node.

2. The method of claim 1, wherein the second link state packet is not analyzed solely for purposes of verifying two-way connectivity.

3. The method of claim 1, further comprising:

setting a two-way connectivity flag in response to determining that two-way connectivity exists between first and second nodes, wherein the two-way connectivity flag indicates that a valid two-way connection exists between first and second nodes.

4. The method of claim 1, wherein a PATH data structure and a TENT data structure are maintained.

5. The method of claim 1, wherein the first link state packet is scanned only once.

6. The method of claim 1, wherein the second link state packet is scanned only once.

7. The method of claim 1, wherein the network topology is generated using Intermediate System-Intermediate System Link State Routing.

8. The method of claim 1, wherein the network topology is generated using Open Shortest Path First Routing.

9. The method of claim 1, further comprising generating routing table information using the network topology information.

10. The method of claim 4, wherein the PATH and TENT data structures are rolled-back in response to a determination that two-way link connectivity checking has failed.

11. The method of claim 1, wherein reverse path insertion is used to generate network topology information in response to a determination that two-way link connectivity checking has failed.

12. The method of claim 4, wherein the PATH data structure is associated with a verification flag used for two-way connectivity checking.

13. The method of claim 4, wherein the PATH data structure is associated with multiple verification flags used for two-way connectivity checking, wherein the number of verification flags is equal to the maximum number of parent nodes.

14. The method of claim 13, wherein a first verification flag is set to true when two-way connectivity is verified between a first node and a second node.

15. The method of claim 14, wherein a second verification flag is set to true when two-way connectivity is verified between a first node and a third node.

16. A method for generating network topology information, the method comprising:
- receiving link state packets from a plurality of network nodes;
- performing a single scan of the link state packets from the plurality of network nodes to generate network topology information associated with the plurality of network nodes, wherein the single scan performs two-way connectivity checking between two or more network nodes.

17. The method of claim 16, further comprising:
generating routing table information using the generated topology information.

18. A method for generating a network topology, the method comprising:
- generating first network topology information using a first link state packet from a first node; and
- generating second network topology information using a second link state packet from a second node, wherein generating second network topology information comprises performing two-way connectivity verification between the first node and the second node.

19. The method of claim 18, wherein the second link state packet is scanned only once to generate the second network topology information.

20. A computer program product comprising a machine readable medium on which is provided program instructions for generating a network topology, the computer program product comprising:
- computer code for generating first network topology information using a first link state packet from a first node; and
- computer code for generating second network topology information using a second link state packet from a second node, wherein generating second network topology information comprises performing two-way connectivity verification between the first node and the second node.

21. The computer program product of claim 20, wherein the second link state packet is not analyzed solely for purposes of verifying two-way connectivity.

22. The computer program product of claim 20, further comprising:
setting a two-way connectivity flag in response to determining that two-way connectivity exists between first and second nodes, wherein the two-way connectivity flag indicates that a valid two-way connection exists between first and second nodes.

23. The computer program product of claim 20, wherein logs of PATH and TENT data structures are maintained.

24. The computer program product of claim 20, wherein the first link state packet is scanned only once.

25. The computer program product of claim 20, wherein the second link state packet is scanned only once.

26. The computer program product of claim 20, wherein the network topology is generated using Intermediate System-Intermediate System Link State Routing.

27. The computer program product of claim 20, wherein the network topology is generated using Open Shortest Path First Routing.

28. The computer program product of claim 20, wherein network topology information is generated using Dijkstra's algorithm.

29. The method of claim 20, further comprising generating routing table information using the network topology information.

30. The method of claim 20, wherein two-way link connectivity checking fails.

31. The method of claim 30, wherein reverse path insertion is used where two-way link connectivity checking fails.

32. An apparatus for generating network topology information, the apparatus comprising:
- memory;
- at least one processor coupled with memory; and
- at least one interface;
- the processor being configured to generate first network topology information using a first link state packet from a first node and generate second network topology information using a second link state packet from a second node, wherein generating second network topology information comprises performing two-way connectivity verification between the first node and the second node.

33. The apparatus of claim 32, wherein the processor is further configured to scan a second link state packet once to generate the second network topology information.

34. The apparatus of claim 32, wherein the processor is further configured to set a two-way connectivity flag in response to determining that two-way connectivity exists between first and second nodes, wherein the two-way connectivity flag indicates that a valid two-way connection exists between first and second nodes.

35. The apparatus of claim 32, wherein the processor is further configured to stored into memory a PATH and a TENT data structure.

36. The apparatus of claim 35, wherein the PATH data structure is associated with at least one verification flag used for verifying two-way connectivity checking.

37. The apparatus of claim 35, wherein the PATH data structure is associated with multiple verification flags used for two-way connectivity checking, wherein the number of verification flags is equal to the maximum number of parent nodes.

38. The apparatus of claim 37, wherein a first verification flag is set to true when two way connectivity is verified between a first node and a second node.

39. The apparatus of claim 38, wherein a second verification flag is set to true when two way connectivity is verified between a first node and a third node.

40. The apparatus of claim 32, wherein the processor is configured to scan the second link state packet once.

41. The apparatus of claim 32, wherein the processor is configured to generate network topology using Intermediate System-Intermediate System Link State Routing.

42. The apparatus of claim 32, wherein the processor is configured to generate network topology information using Dijkstra's algorithm.

43. The apparatus of claim 32, wherein the processor is configured to generate routing table information using the network topology information.

44. The apparatus of claim 35, wherein the processor is configured to roll-back the PATH and TENT data structures in response to a determination that two-way link connectivity checking has failed.

45. The apparatus of claim 32, wherein the processor is configured to use reverse path insertion to generate network topology information in response to a determination that two-way link connectivity checking has failed.

46. An apparatus for generating network topology information, the apparatus comprising:
means for identifying a first link state packet associated with a first node;
means for identifying a second link state packet associated with a second node;
means for generating network topology information associated with the first node using information from the first link state packet; and
means for deferring verification of two-way connectivity checking between the first node and the second node until analysis of second link state packet is initiated for generating network topology information associated with second node.

47. The apparatus of claim 46, wherein the second link state packet is not analyzed solely for purposes of verifying two-way connectivity.

48. The apparatus of claim 46, further comprising:
means for setting a two-way connectivity flag in response to determining that two-way connectivity exists between first and second nodes, wherein the two-way connectivity flag indicates that a valid two-way connection exists between first and second nodes.

49. The apparatus of claim 46, wherein logs of PATH and TENT data structures are maintained.

50. The apparatus of claim 46, wherein the first link state packet is scanned only once.

51. The apparatus of claim 46, wherein the second link state packet is scanned only once.

52. The apparatus of claim 46, wherein the network topology is generated using Intermediate System-Intermediate System Link State Routing.

53. The apparatus of claim 46, wherein network topology information is generating using Dijkstra's algorithm.

54. The apparatus of claim 46, further comprising generating routing table information using the network topology information.

55. The apparatus of claim 46, wherein two-way link connectivity checking fails.

56. The apparatus of claim 55, wherein reverse path insertion is used where two-way link connectivity checking fails.

* * * * *